United States Patent [19]
Howes

[11] Patent Number: 5,528,426
[45] Date of Patent: Jun. 18, 1996

[54] LASER BLOCK BEAM SPLITTER FOR MICROSCOPES

[75] Inventor: Allen R. Howes, Walnut Creek, Calif.

[73] Assignee: TTI Medical, Pleasanton, Calif.

[21] Appl. No.: 274,874

[22] Filed: Jul. 14, 1994

[51] Int. Cl.⁶ .............................. G02B 27/14; G02B 5/04; G02B 27/02
[52] U.S. Cl. .................... 359/629; 359/835; 359/480
[58] Field of Search ................................. 359/629, 480, 359/481, 482, 375, 583, 835, 640, 831

[56] References Cited

U.S. PATENT DOCUMENTS

| | | | |
|---|---|---|---|
| 4,499,897 | 2/1985 | Roussel | 128/303.1 |
| 4,561,436 | 12/1985 | Munnerlyn | 128/303.1 |
| 4,633,872 | 1/1987 | Chaffee et al. | 128/303.1 |
| 4,657,013 | 4/1987 | Hoerenz et al. | 128/303.1 |
| 4,688,907 | 8/1987 | Kleinberg | 350/516 |
| 4,711,542 | 12/1987 | Ichihashi et al. | 351/221 |
| 4,786,155 | 11/1988 | Fantone | 359/629 |
| 4,827,125 | 5/1989 | Goldstein | 250/234 |
| 4,877,321 | 10/1989 | Ichihashi et al. | 351/214 |
| 4,991,947 | 2/1991 | Sander | 359/375 |
| 5,052,789 | 10/1991 | Kleinberg | 359/375 |
| 5,078,469 | 1/1992 | Clark | 359/481 |
| 5,098,426 | 3/1992 | Sklar et al. | 606/5 |
| 5,127,730 | 7/1992 | Brelje et al. | 356/318 |
| 5,264,928 | 11/1993 | Howes | 358/93 |
| 5,438,456 | 8/1995 | Grinblat | 359/835 |

Primary Examiner—Georgia Y. Epps
Assistant Examiner—Ricky Mack
Attorney, Agent, or Firm—Townsend and Townsend and Crew

[57] ABSTRACT

A laser block beam splitter system for microscopes comprising a main body housing, a laser safety filter, two optical trains, a pair of beam splitters, and three viewing stations. The beam splitters provide an image along both an axial beam path and a transverse beam path relative to the main body housing. The laser safety filter is disposed at the distal portion of both optical trains before the pair of beam splitters to protect the viewing stations from laser radiation. The three viewing stations of the laser block beam splitter system are thereby continually protected from laser radiation by the laser safety filter.

20 Claims, 4 Drawing Sheets

LASER BLOCK BEAM SPLITTER FOR MICROSCOPES

BACKGROUND OF THE INVENTION

1. Field of the Invention

The present invention relates generally to optical equipment, and more particularly to a laser block beam splitter system for microscopes suitable for protecting the viewing stations from laser light radiation.

Medical and research microscopes frequently incorporate beam splitter assemblies to permit additional viewing, video and 35 mm camera attachments. Commonly available beam splitters have two optical trains and provide two lateral optical viewing ports in addition to the primary viewing port. Such beam splitters are available commercially from microscope suppliers such as Carl Zeiss, Inc., Leica, Storz and Topcon.

In order to safely use a laser while viewing through a microscope, the prior art has provided a mechanical shutter assembly to be mounted between the beam splitter and the microscope body. Such mechanical shutter assemblies are available commercially from laser suppliers such as Coherent, Laserscope, Sharplan, Nidek and Carl Zeiss, Inc.

While functional and useful, such beam splitter and mechanical shutter assembly combinations restrict the view of the primary and lateral viewing ports when the laser is activated. The restricted view is caused by the mechanical shutter assembly which introduces a beam blocking device into both optical trains when the laser is activated.

A particular concern is the desire to provide continual unobstructed viewing to all viewing stations while a laser is activated. With the present equipment, such continual unobstructed viewing is not possible.

An additional concern is the reliability of a mechanical shutter assembly to perfectly activate and deactivate at the desired moment of use. With the present mechanical shutter assemblies, there is the ever present possibility of non-function due to electronic or mechanical failure. Such a non-function could result in severe eye injury to the operator.

Another concern is keeping the physical mass of the microscope, beam splitter and laser protection mechanism to a minimum. When the physical mass is increased, the operating comfort and efficiency of the primary and lateral stations are compromised.

For these reasons, it would be desirable to provide a beam splitter with an integrated laser safety filter. Such a system would provide continual, safe and unobstructed viewing to the viewing stations during laser activation. Also, such a system would eliminate the possibility of electronic and mechanical failures and reduce the physical mass of the microscope assembly when using a laser.

2. Description of the Background Art

A slit lamp microscope for observing eye tissue having linear polarizers is shown in U.S. Pat. No. 4,877,321. A medical dose-integrating device for measuring the illumination exposure of light-sensitive organs is shown in U.S. Pat. No. 4,657,013. A true multi-color laser scanning confocal imaging system for microscopes is shown in U.S. Pat. No. 5,127,730. A medical apparatus for detecting ophthalmic diseases using lasers is shown in U.S. Pat. No. 4,711,542. A medical laser optical delivery device having a blocking shutter is shown in U.S. Pat. No. 4,633,872. An optical head for observation and treatment of an eye with a laser is shown in U.S. Pat. No. 4,499,897. A medical laser ophthalmic device having a safety stop shutter is shown in U.S. Pat. No. 4,561,436. A system for precision laser surgery is shown in U.S. Pat. No. 5,098,426. A confocal scanning laser microscope having no moving parts is shown in U.S. Pat. No. 4,827,125. A beam splitter having three identical optical trains and four viewing stations is shown in U.S. Pat. No. 4,688,907.

SUMMARY OF THE INVENTION

The present invention overcomes the limitations just described by providing a microscope beam splitter with an integrated laser safety filter. The laser block beam splitter system comprises a main body housing, two optical trains with an integrated laser safety filter and three viewing stations. The axial viewing light entering the two optical trains pass through the laser safety filter. The axial filtered light then travels to beam splitting optics which reflect a portion of the axial filtered light along a transverse beam path to each lateral port of the main body housing. A binocular viewing tube is typically mounted to the primary viewing port of the main body housing. The two transverse beam lateral ports permit mounting of additional viewing, video and 35 mm camera attachments.

In a particular aspect of the present invention, the laser safety filter is an integral part of the axial beam path optics where each of the three viewing ports permit continual, safe, unobstructed viewing through the microscope during laser activation. A particular advantage of the present invention is that video and 35 mm camera documentation will be free from optical obstruction caused by a mechanical shutter assembly.

In another aspect of the present invention, by integrating a laser safety filter into a beam splitter assembly, the physical mass of the equipment is minimized and the potential electronic and manual failure of a beam block shutter is eliminated.

A further understanding of the nature and advantages of the present invention may be realized by reference to the remaining portions of the specification and the drawings.

DESCRIPTION OF THE SPECIFIC EMBODIMENTS

Figure 1:
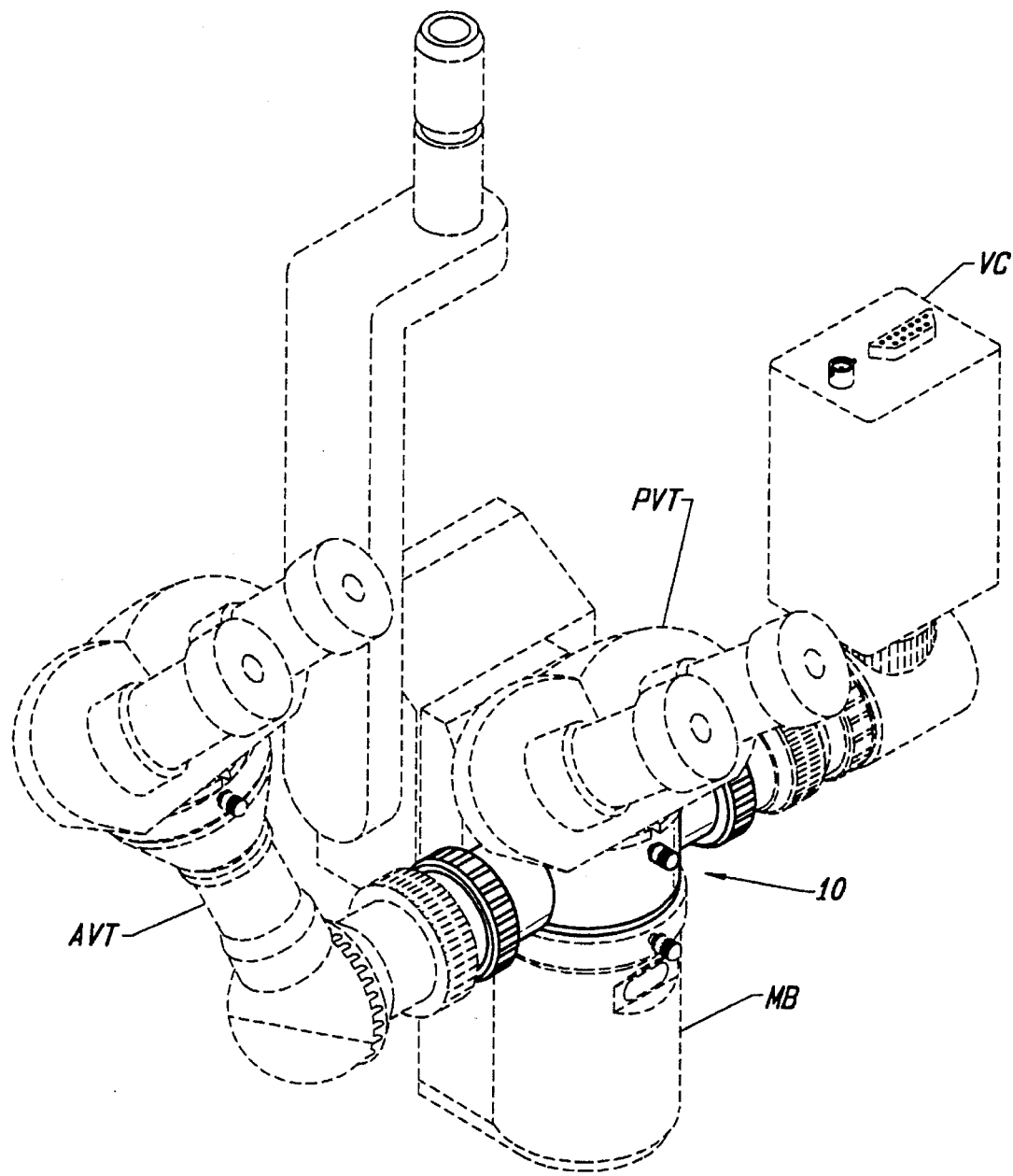
FIG. 1 is a perspective view illustrating a laser block beam splitter system constructed in accordance with the principles of the present invention and mounted between the body and primary viewing tube of the microscope.

As illustrated in FIG. 1, a laser block beam splitter system 10 may be mounted between a microscope body MB and a primary viewing tube PVT. A lateral viewing tube LVT and a video camera VC are shown connected to the lateral ports of the laser block beam splitter system. The microscope body and viewing tubes are conventional and available from commercial suppliers such as Carl Zeiss, Inc. As will be discussed in detail below, laser block beam splitter system 10 includes a number of components which permit the three viewing stations of the system to be continually protected from laser radiation.

Figure 2:
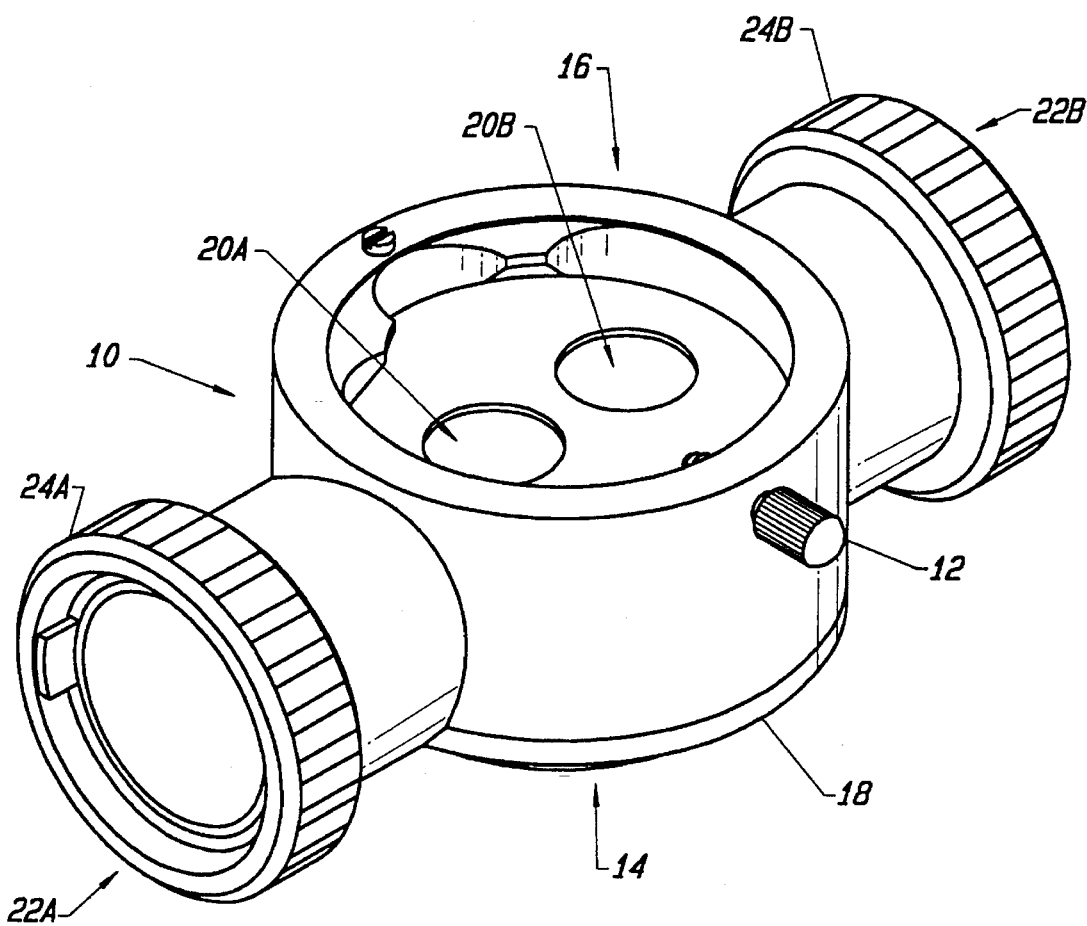
FIG. 2 is a perspective view of the laser block beam splitter system of the present invention.

Referring now to FIG. 2, the basic construction of the laser block beam splitter system of the present invention will be described. The system includes a main body housing 12, which is generally cylindrical in shape and has a distal end 14 and a proximal end 16. At the distal end of the housing is a distal plate 18. Distal end 14 of the laser block beam splitter system is mounted to microscope body MB. At the proximal end of the laser block beam splitter system is the primary viewing port which may accept primary viewing tube PVT as shown in FIG. 1.

The main body housing defines axial passages 20A and 20B through which two optical trains proceed to the primary viewing port. Beam splitters within main body housing 12 split the light in each optical train along a transverse beam path to two lateral viewing ports 22A and 22B. The lateral viewing ports extend from the side of the main body housing and each has a conventional locking ring 24A and 24B, respectively. The locking rings are used to secure lateral viewing tubes, video cameras and 35 mm cameras to the lateral viewing ports.

Figure 3:
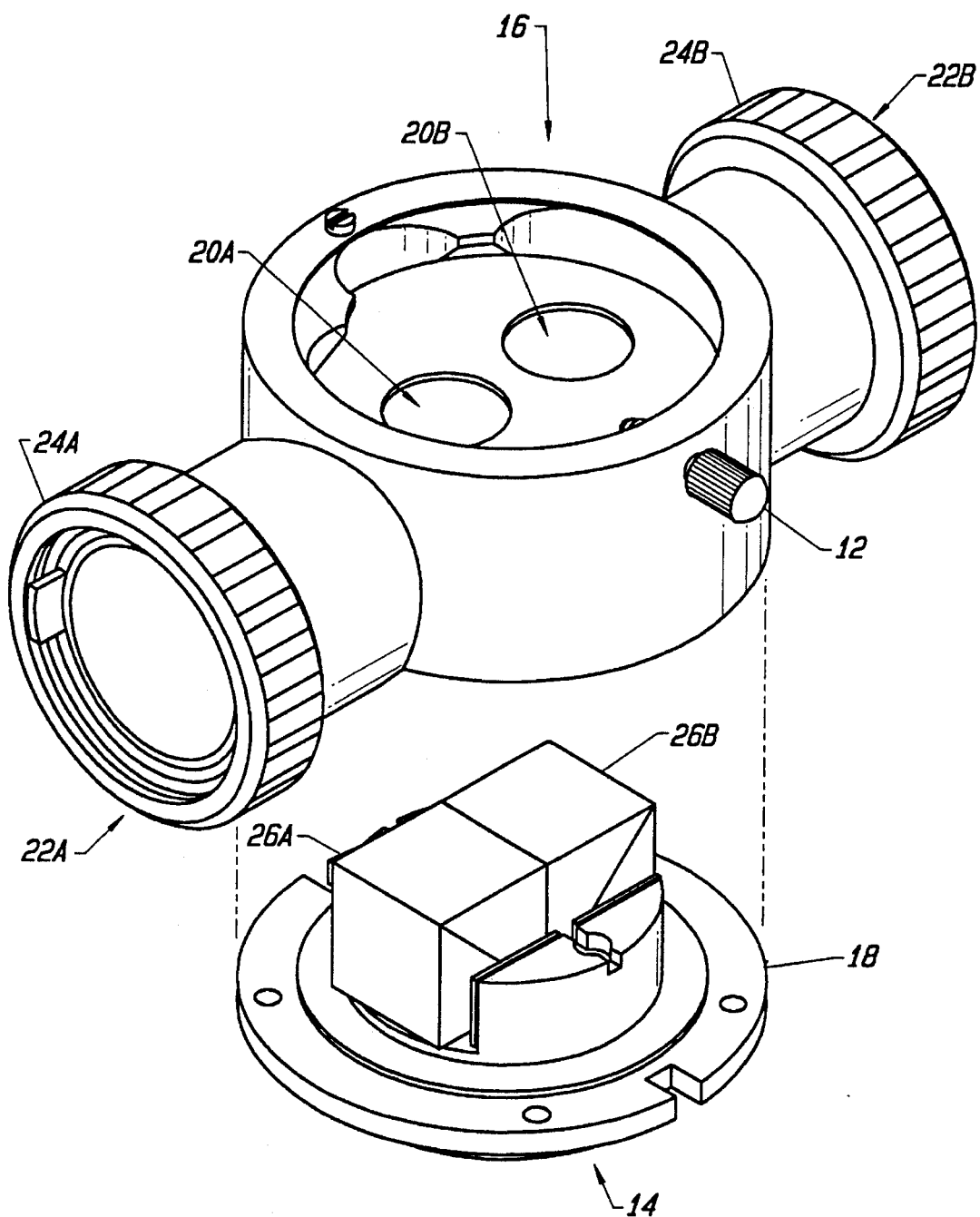
FIG. 3 is an exploded view of the laser block beam splitter system of the present invention.

In FIG. 3, the main body housing is shown separated from distal plate 18. Disposed on the distal plate are the beam splitters 26A and 26B. The beam splitters are depicted as a pair of opposed prisms, but it would also be possible to utilize a single prism, a partially reflective mirror, a pivotable mirror, or any equivalent structure which would partially reflect axial light along a transverse beam path.

Figure 4:
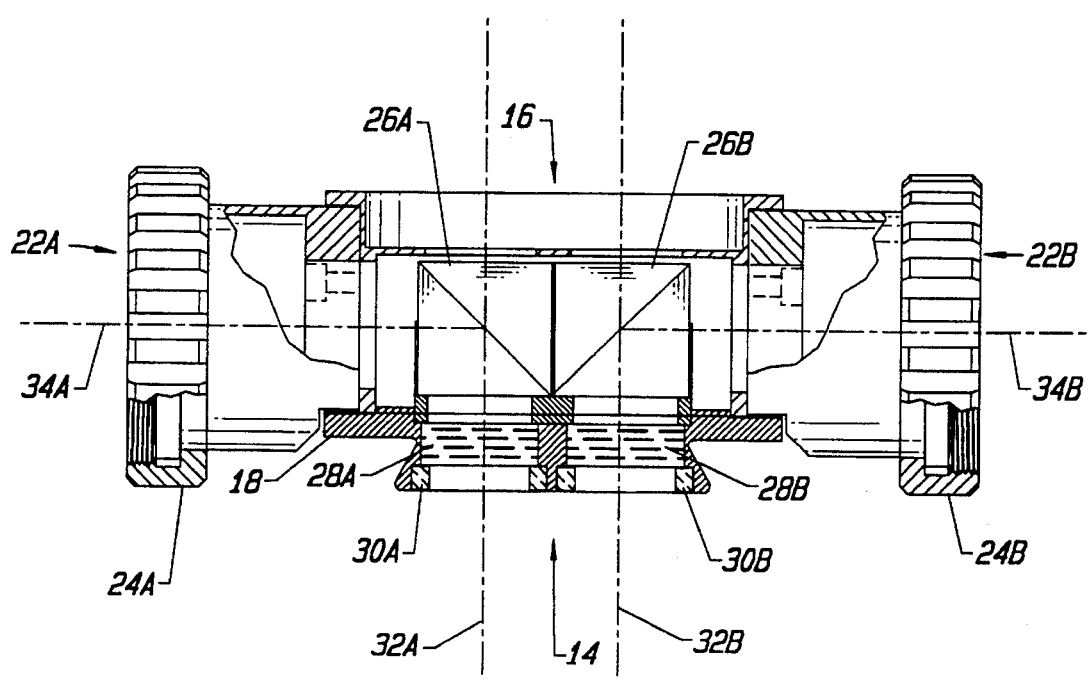
FIG. 4 is a cross-sectional view of the laser block beam splitter system of the present invention.

In FIG. 4, a cross-sectional view of the laser block beam splitter system of the present invention is shown. Distal plate 18 contains a pair of laser safety filters 28A and 28B. Each laser safety filter is secured to the distal plate by a retaining ring 30A and 30B. Although two laser safety filters are shown, one for each optical train, it would be possible to utilize a single laser safety filter.

The operation of the laser block beam splitter of the present invention will now be discussed in reference to FIG. 4. Axial viewing light enters along beam paths or axes 32A and 32B into the laser block beam splitter at the distal end. The axial viewing light is then filtered by laser safety filters 28A and 28B. The laser safety filters filter out or block laser radiation that may be harmful to the operator or equipment at the viewing stations. For example, an integrated laser filter that attenuates light in the range of 450 nanometers to 550 nanometers is utilized for use with a commonly available Argon laser.

The axial filtered light then reach beams splitters 26A and 26B. The beam splitters let a portion of the axial filtered light pass through along beam paths or axes 32A and 32B to the primary viewing port, which is located at the proximal end of the laser block beam splitter system. Beam splitters 26A and 26B also reflect a portion of the axial filtered light along transverse beam path axes 34A and 34B, respectively. The transverse reflected light proceeds to the lateral ports of the laser block beam splitter system. The lateral viewing ports can accept a lateral viewing tube LVT, video camera VC, 35 mm camera, or any other conventional microscope attachment that can be secured with conventional locking rings.

In one embodiment, laser safety filters 28A and 28B are coated with a film that allows the filters to be substantially optically clear (e.g., less than 5% light loss) until energized by laser light. Laser filters of the type described are available from a number of different manufacturers.

The laser block beam splitter of the present invention preferably has the laser safety filters in the axial viewing light path before the beam splitters so that one filter blocks laser radiation along two beam paths. However, a laser safety filter could be placed after the beam splitters at each viewing port. Although this configuration may add weight to the system, each viewing port would be continually protected by laser radiation.

Although the foregoing invention has been described in detail for purposes of clarity and understanding, it will be obvious that various modifications, alternative constructions, and equivalents may be used. For example, the blocking range of the laser filter, the number of optical trains, number of viewing ports, and type of beam splitter may be varied yet still be within the spirit of the invention. Therefore, the above description should not be taken as limiting the scope of the invention as defined by the following claims.

What is claimed is:

1. A beam splitter system for a microscope, said system comprising:

a main body housing having a proximal end, a distal end and a lateral port, said distal end couples to a microscope body, said proximal end receives a first attachment, and said proximal and distal ends defining an axial beam path;

a beam splitter located within said main body housing, said beam splitter oriented to receive light along said axial beam path and to reflect a portion of said light along a transverse beam path to said lateral port; and at least one filter mounted within said main body housing so that light leaving said system along said axial and transverse beam paths is filtered.

2. The beam splitter system of claim 1, wherein said beam splitter includes at least one prism.

3. The beam splitter system of claim 1, wherein said beam splitter is a pivotal mirror.

4. The beam splitter system of claim 1, wherein said beam splitter is a partially reflective mirror.

5. The beam splitter system of claim 1, wherein said filter reduces laser radiation.

6. The beam splitter system of claim 1, wherein said lateral port receives a second attachment, wherein said second attachment is selected from the group consisting of a viewing tube, video camera, and 35 mm camera.

7. A beam splitter system for a microscope, said system comprising:

a main body housing having a proximal end, a distal end and a lateral port, said distal end couples to a microscope body, said proximal end receives a first attachment, and said proximal and distal ends defining an axial beam path;

a laser safety filter mounted within said main body housing so that light along said axial beam path passes through said laser safety filter; and a beam splitter located within said main body housing, said beam splitter oriented to receive said laser filtered axial light and to reflect a portion of said laser filtered axial light along a transverse beam path to said lateral port.

8. The beam splitter system of claim 7, wherein said beam splitter includes at least one prism.

9. The beam splitter system of claim 7, wherein said beam splitter is a pivotal mirror.

10. The beam splitter system of claim 7, wherein said beam splitter is a partially reflective mirror.

11. The beam splitter system of claim 7, wherein said axial beam path includes two optical trains and said beam splitter system includes a laser safety filter for each optical train.

12. The beam splitter system of claim 7, wherein said lateral port receives a second attachment, wherein said second attachment is selected from the group consisting of a viewing tube, video camera, and 35 mm camera.

13. A beam splitter system for a microscope, said system comprising:

a main body housing having a proximal end, a distal end and a lateral port, said distal end couples to a microscope body, said proximal end receives a first attachment, and said proximal and distal ends defining an axial beam path including two optical trains;

a laser safety filter mounted within said main body housing so that light along said two optical trains passes through said laser safety filter; and two beam splitters located within said main body housing, each of said beam splitters oriented to receive said laser filtered axial light along one of said two optical trains and to reflect a portion of said laser filtered axial light along a transverse beam path to one of said two lateral ports.

14. The beam splitter system of claim 13, wherein each of said beam splitters include at least one prism.

15. The beam splitter system of claim 13, wherein each of said beam splitters include a pair of opposed prisms.

16. The beam splitter system of claim 13, wherein each of said beam splitters is a pivotal mirror.

17. The beam splitter system of claim 13, wherein each of said beam splitters is a partially reflective mirror.

18. The beam splitter system of claim 13, wherein said beam splitter system includes a laser safety filter for each optical train.

19. The beam splitter system of claim 13, wherein said laser safety filter is approximately 95% optically clear until energized by laser light.

20. The beam splitter system of claim 13, wherein said lateral port receives a first attachment, wherein said second attachment is selected from the group consisting of a viewing tube, video camera, and 35 mm camera.

* * * * *